PRICING APPARATUS FOR SUBSCRIPTION TELEVISION

Filed Aug. 14, 1961 2 Sheets-Sheet 1

PATRICK R. J. COURT
*INVENTOR.*

*BY* Lyon & Lyon

ATTORNEYS.

May 18, 1965 P. R. J. COURT 3,184,538

PRICING APPARATUS FOR SUBSCRIPTION TELEVISION

Filed Aug. 14, 1961 2 Sheets-Sheet 2

PATRICK R. J. COURT
*INVENTOR.*

BY Lyon & Lyon

ATTORNEYS.

United States Patent Office 3,184,538
Patented May 18, 1965

3,184,538
PRICING APPARATUS FOR SUBSCRIPTION TELEVISION

Patrick R. J. Court, Los Angeles, Calif., assignor to Paramount Pictures Corporation, New York, N.Y., a corporation of New York Filed Aug. 14, 1961, Ser. No. 131,135
6 Claims. (Cl. 178—5.1)

This invention relates to subscription-television systems, and, more particularly, to improvements for indicating the cost of a program at a receiver.

In a subscription-television system, a charge is made to each subscriber for enabling him to view a program which is to be transmitted. This arrangement differs from the community-antenna television systems wherein each subscriber pays a fixed fee monthly, since in a subscription-television system the price to be charged for each program may vary. A number of different systems have been proposed heretofore for transmitting pricing information to subscriber receivers. These systems usually involve the transmission of digital signals with considerable circuitry, both electrical and electromechanical, at the transmitter and at the receiver for interpreting the signals and presenting a display of the price to the subscriber.

An object of this invention is to provide an analog pricing arrangement for a subscription-television system.

Another object of this invention is to provide a simplified pricing arrangement for a subscription-television system.

Still another object of this invention is the provision of a novel and useful arrangement for conveying pricing information to a receiver by a single tone.

These and other objects of the invention are achieved in a subscription-television system by generating at a transmitter a tone, the frequency of which represents the price which is to be demanded, before a viewer can see a program. This tone is transmitted to all subscriber receivers which are equipped with circuits which detect the tone and instruct apparatus to indicate a price which the tone represents.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
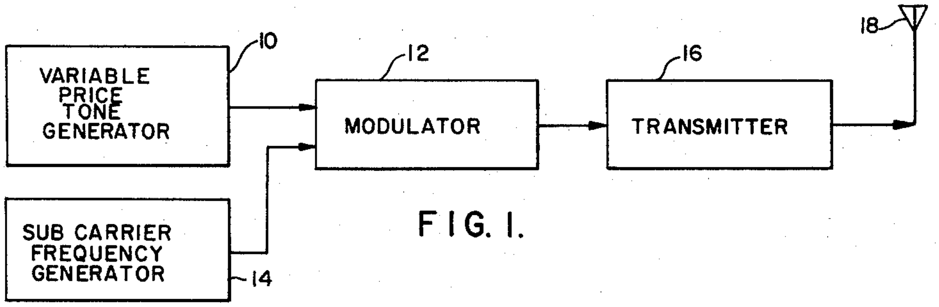
FIGURE 1 is a block diagram of apparatus employed at a transmitter for sending a tone signal representative of a price, in accordance with this invention.

Referring now to the drawings, in FIGURE 1 there may be seen a simplified block diagram of the apparatus which may be used at a transmitter for transmitting tone signals in accordance with this invention. As previously indicated, in a subscription-television system the subscribers are informed prior to transmitting a program as to the amount which must be paid in order to view this program. There is apparatus provided at each subscriber-receiver which, in response to a signal from a transmitter, indicates what this price is.

In accordance with this invention, the signal which is transmitted may comprise a single tone signal. This tone signal is generated by a variable-price tone generator 10, which may comprise any well-known variable-frequency oscillator. The output, comprising a single tone signal, represents the price for viewing a program. It is applied to a modulator 12 to be modulated on a subcarrier, which is derived from a subcarrier frequency generator 14. The output of the modulator is applied to the remaining usual transmitter circuits 16, to be thereafter radiated by means of the antenna 18. It will be appreciated that the manner of transmission represented in FIGURE 1—that is, modulating the tone on a subcarrier frequency—is only one of many which may be employed. The manner of transmission of this tone signal is not material. What is material is that a tone signal, representing a price which must be paid, is generated at the transmitter and transmitted to a subscriber-receiver.

Figures 3, 4:
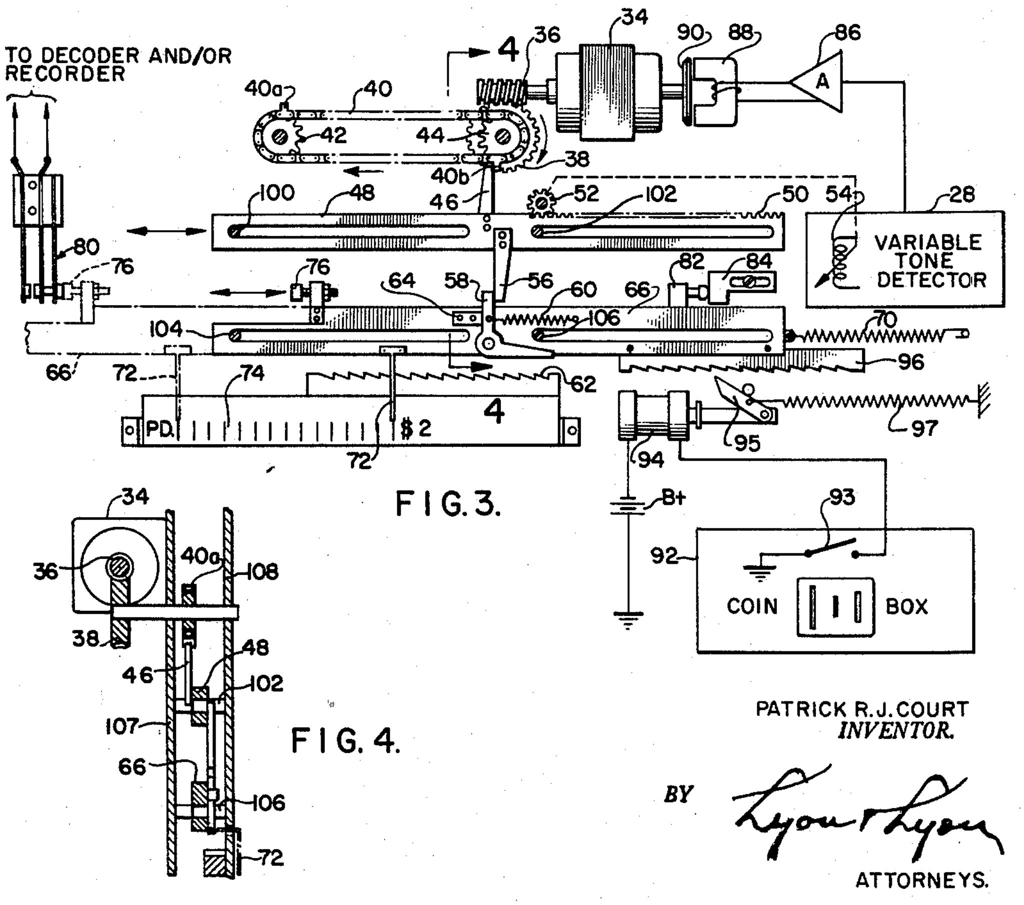
FIGURE 3 is a drawing of the pricing apparatus in accordance with this invention, which is actuated in response to the tone signal to represent the price for viewing a program.
FIGURE 4 is a view along the lines 4—4 showing a side view of the pricing apparatus in FIGURE 3.

At the receiver an antenna 20 picks up the signals radiated from the transmitter and applies these to the RF tuner 22. The tuner, which is tuned to receive signals from the station broadcasting a desired subscription-television program, applies these signals to the receiver circuits 24, which may comprise the remainder of the usual commercial television receiver and also to a trap circuit 26, which is here represented by a rectangle, labeled "tuned circuit." This can comprise a filter circuit, which will pass only a subcarrier frequency upon which the tone signal is modulated. The output of the subcarrier trap 26 is applied to a variable tone detector 28. The function of this variable tone detector is to demodulate a tone signal from the subcarrier frequency. The tone-detector tuning is varied by pricing apparatus 30, in a manner to be described, until it is tuned to the frequency of the tone being transmitted, at which time it stops. The output of the variable tone detector is applied to the pricing apparatus 30, the details of which are shown in FIGURE 3. The function of the pricing apparatus 30 is to establish the price which the tone represents. The pricing apparatus also receives payment for the price which is established, whereupon it enables a program decoder and recorder circuit 32 to decode the program and make a recording representative of the fact that the program was purchased.

Figure 2:
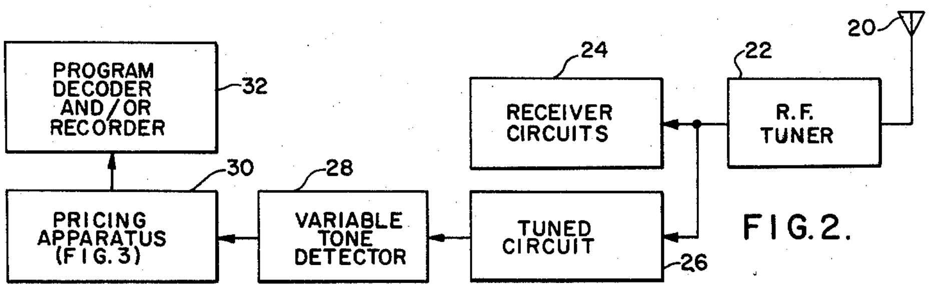
FIGURE 2 is a block diagram of apparatus required at a receiver for responding to a tone signal from the transmitter.

All the circuits except the pricing apparatus 30, which is represented by the block diagrams of FIGURE 1 and FIGURE 2, are well known and therefore will not be described in further detail herein.

FIGURE 3 shows the structure of the pricing apparatus which operates in accordance with this invention to establish the price of a program in accordance with the tone signal. A motor 34, via suitable drive mechanism here represented by a worm-drive gear 36 which engages a gear 38, drives a belt 40. The belt 40 is supported on two rotatable gears 42, 44. The belt has two projections 40A, 40B. As the belt rotates in a clockwise direction in response to the drive from the motor, the projections can engage an upward projecting member 46, supported from a slide member 48. As shown in FIGURE 3, the projection 40B engages the upward-projecting member 46, and it is moved; as a result, it moves the slide member 48 to the left. A rack and pinion arrangement is provided by a portion of the slide member 48, which has teeth 50 formed therein which are engaged by the pinion gear 52. Thus, as the first slide member 48 moves to the left, the teeth 50 cause the gear 52 to be rotated. Such rotation is coupled by any well-known means, such as a shaft, to a variable tuning arrangement represented by the variable inductor 54, which causes the variable tone detector 28 to be tuned over a range of tones.

Effectively, the arrangement described thus far is one for causing the variable tone detector 28 to have its tuning altered over a range which covers the range of prices represented by variable tones.

The slide member 48 has another projecting member 56 extending downwardly thereform. This member engages a pivotal pawl member 58. The pawl member is biased to pivot in one direction by a spring 60, which, if permitted, would cause the other end of the pawl member to engage the teeth of a ratchet member 62. However, the push of the downward-projecting member 56 against the end of the ratchet 58 keeps the ratchet in the position shown, wherein it does not engage the pawl 62. A stop member 64 prevents the pawl from pivoting further in response to the push by the member 56.

The pawl 58 and the stop member 64 are mounted on another slide member 66. Thus, as the belt 40 moves the slide member 48 to the left, the projection 56 engages the pawl 58 and thereby moves the slide member 66 along with it. The slide member 66 is biased to return by means of a spring 70, which is attached to one end.

The slide member 66 carries a pointer or indicator 72 over a scale 74, on which the various prices to be charged for a program are marked. The extreme right-hand location on the scale indicates the maximum price, and on the extreme left of the scale the paid position is marked. Thus, as the member 66 is moved from right to left, the indicator 72 will show the range of prices from the maximum down to the zero paid-up price. The slide member 66 carries a switch-actuating member 76, which closes or operates a switch 80 when the slide member 66 is moved to its extreme left-hand position, which is the paid-up position. When this switch is maintained actuated for a time, it enables other apparatus in the receiver, such as the decoder and/or recorder, to function.

When the slide member 66 reaches the position beyond that in which it will close the switch 80, the projection 40B or 40A, as the case may be, is disengaged from the upward-projecting member 46, whereby the spring 70 can return the slide member 60 to the starting position, carrying with it, by virtue of the engagement of the pawl 58 and downward-projecting member 56, the slide member 48. The slide member 66 carries another stop 82, which engages a fixed stop member 84. Thus, the position to which the slide member 66 and the slide member 48 are returned may be established. In returning, the slide member 48 actuates the rack and pinion arrangement, whereby the variable tone detector is reset to the first tone of its tuning range.

In the system thus far described, the motor 34 will drive the price indicator from its highest to its lowest price, simultaneously varying the tone to which the apparatus is tuned, whereupon the price indicator is reset. The range operation occurs repeatedly, until a tone is received from the transmitter, which operates the apparatus in the manner to be described, to establish a price represented by that tone. The apparatus will range over the prices at one rate, which is slow compared to the rate of resetting, which is rapid.

Assume, now, that a tone representing a price is transmitted. This tone is one representing for example, the price $1.50. The apparatus shown in FIGURE 3 will continue its ranging operation until the variable tone detector 28 is tuned to the tone being transmitted. At that time, its output, which is applied to an amplifier 86, attains a level which enables a solenoid 88 to operate a brake 90. This causes the motor 34 to stop. This, in turn, arrests the forward motion of the sliding members, whereby the indicator 72 is stopped at the price which must be paid before the program can be viewed.

A coinbox 92 is provided at the receiver. This coinbox contains well-known apparatus for sizing a coin which is deposited therein and for closing a switch 93 a number of times proportionate to the value of the coin. By virtue of the series connection of switch 93, solenoid 94, and B+, the solenoid will operate each time the switch is closed. This pulls the pawl 95 to the right each time the solenoid is operated. The pawl 95 engages the rack gear 96 and thus moves the slide member 66 toward the paid up position. The spring 97 disengages the pawl 95 from the rack gear 96 each time solenoid 94 is deenergized.

Thus, in accordance with this invention, the slide member 66 is positioned at a location representative of the price which is demanded for viewing a program, and, thereafter, it may be driven a distance as determined by the amount deposited in the coinbox 92. When a sufficient amount of coin has been deposited, the slide member 66 is moved a sufficient distance to enable the stop 76 to close or operate the switch 80. At this time, the indicator 72 is at the paid position. It will be noted further that the pivotal ratchet 58, which is no longer being restrained from pivoting by the downward-projecting member 56, is pivoted by the spring 60 so that it engages the rack 62 and holds the slide member 66 in the paid position.

At the end of a program, or at any other desired time, the tone is no longer transmitted. As a result, the solenoid 88 is rendered inoperative, and the motor 34 can commence driving the belt 40. When this happens, the slide member 48 is driven in the direction to cause the downward-projecting member 56 to engage the pawl 58 and pivot it out of engagement with the rack 62. Thereafter, the spring 70 can return the two slide members 48 and 66 to their initial position. The ranging operation will recur thereafter.

FIGURE 4 is a view taken along the lines 4—4 of FIGURE 3. It illustrates how the slide members, respectively 48 and 66, are slidably mounted on pins. The pins 100, 102 extend through grooves in the slidable member 48. The pins 104, 106 support the slidable member 66 by extending through grooves therein, also. These pins are supported in fixed plates 107, 108.

From the foregoing description, it should be appreciated that apparatus is provided whereby, by the selection of one of the plurality of price-representative tones, the subscribers' receivers will all indicate the price which this tone represents when it is transmitted. The tone also can comprise a monitoring signal which enables all the apparatus to be reset when it is discontinued. Furthermore, the tone can be recorded as an indication of the fact that a program has been purchased. The motor need not be operated continuously, except when a pricing operation is to be initiated. This can be signaled from the transmitter in any suitable manner, or the subscriber may be directed to operate a switch when he desires to purchase a program, whereby the motor is energized. If it is desired to transmit a free program, a tone corresponding to the paid-up position is transmitted, and the apparatus will then carry out the instruction inherent in the paid-up representative tone.

Figure 5:
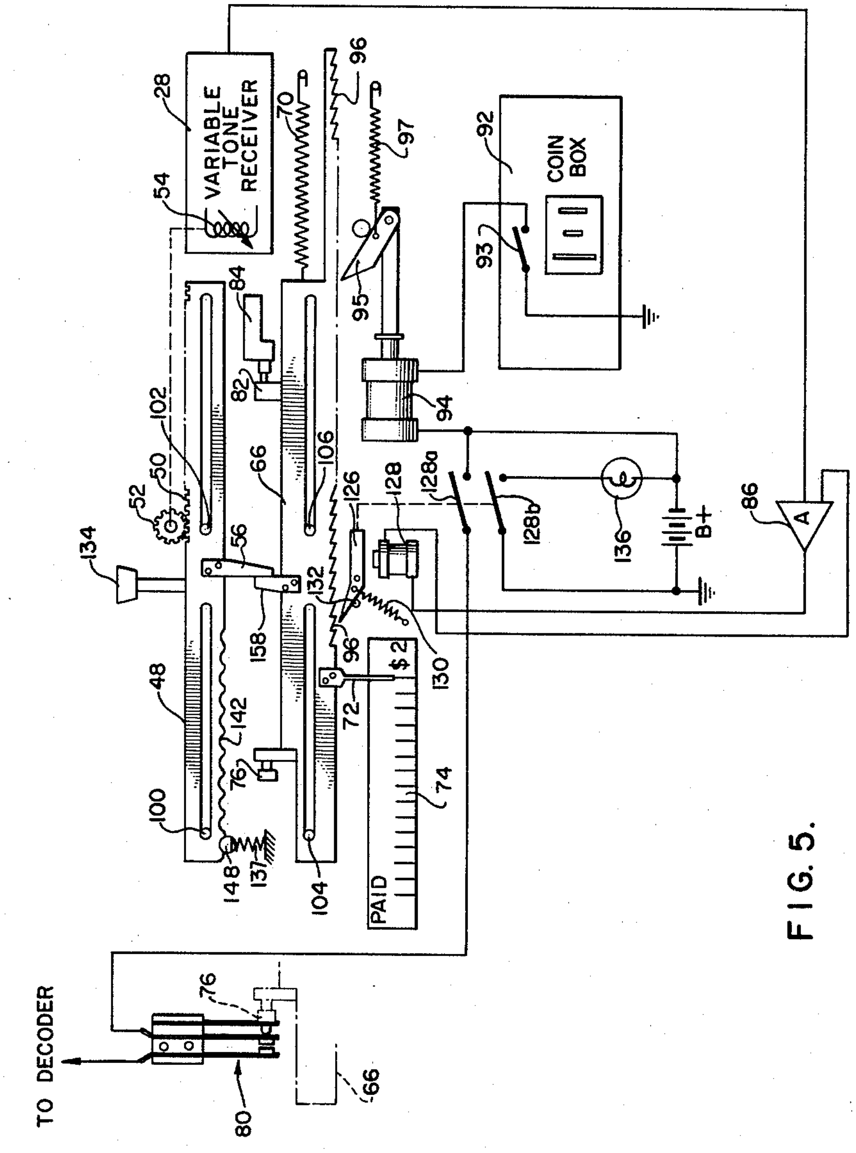
FIGURE 5 is a drawing of pricing apparatus in accordance with this invention which is manually operated.

FIGURE 5 is a drawing of apparatus required at a receiver in accordance with this invention for manually setting up a coin demand when a transmitter sends out a tone signal. This apparatus may be employed in place of the apparatus shown in FIGURE 3, if desired. Effectively, aside from a few modifications which are involved in eliminating the motor 34 in FIGURE 3, the apparatus shown in FIGURE 5 is substantially similar to that of FIGURE 3. Therefore, similar functioning structures are given similar reference numerals.

The upper slide member 48 is manually actuated by any suitable arrangement, such as a handle 134, which is attached to the slide member 48, and, when it is otherwise free to move, can slide the member 48 in an increasing or decreasing price direction, as indicated on the scale 74.

A projecting member 56 extends downwardly as in FIGURE 3 and engages an upwardly extending member 158, which is supported from the lower slide member 66.

Thus, as the member 48 is moved in a direction of increasing price, the member 56 engages the member 158, and the slide member 66 is thus carried to the left. In the absence of any restraining force, a spring 70 biases the member 66 to the right or the highest-price position and will return that member to the right from any position to which it is moved, carrying therewith the member 48. Thus, initially, both the slide members 48 and 66 are in the extreme right-hand, or maximum-price, position.

Assume now that a tone is being transmitted from the transmitter which is indicative of a price being demanded. A subscriber who desires to receive the program which will be transmitted grasps the handle 134 and moves the slides 48 and 66 toward the left, or in a decreasing-price direction. The frequency to which the variable tone detector is tuned is varied from one end of the tuning range to the other by reason of the mechanical attachment of the tuning controls therein to the gear 52, which is rotated by virtue of being in contact with the flat gear 50. As the tone being transmitted is tuned in, the output of the variable tone detector is increased until it can drive the amplifier 86. This amplifier output is applied to a relay 128, to cause it to be energized. This relay, when energized, rotates a pawl 126 into contact with the rack gear teeth 96, which are either a part of or attached to the underportion of the slide member 66. Thus, the slide member 66 is prevented from returning to its right-hand position when the handle 134 is released by the subscriber. The pawl 126 is biased to return by means of a spring 130 against a stop 132 whenever the relay 128 is not energized. In addition to the relay 128 energizing the pawl 126 to prevent motion of the slide member 66 to the right (but not preventing such motion to the left) there are two relay contacts, respectively 128A and 128B, associated with the relay 128. These contacts are normally open. When the relay 128 is energized, contact 128A is closed and applies B+ to the contacts 80, which, it will be recalled, are closed only when the slide member 66 makes contact therewith upon payment of the price which is demanded. Relay contacts 128B, when closed, cause a light 136 to become illuminated, which indicates to the subscriber that he has moved to the proper price-indicating position.

If the subscriber keeps moving the handle 134 beyond the proper price-indicating position, the slide member 66 will continue to move therewith; however, the relay 128 will not be maintained operated any longer, since the variable tone detector will no longer be receiving the tone frequency from the transmitter. In that event, of course, the output of amplifier 86 is insufficient to energize relay 128. Thus, the subscriber knows when he has gone beyond the proper price-indicating position by virtue of the light 136 going out. Of course, the relay contact 128A will at that time no longer supply operating potential to the contact 80, so that the converter or other apparatus which enables the intelligible receiving of a television program is not energized. If desired for more positive price setting, there may be provided apparatus for providing a detent action at each different price position. This is afforded by means of a spring 137 which biases a metal ball 148 into rolling contact with the detent stops 142 on the underside of the member 48.

Assume that the subscriber removes his hand from the handle 134 when he sees the light 136 illuminated. The price which is demanded for the program as indicated on the scale 74 by the indicating pointer 72, which is attached to the slide member 66. The subscriber can then commence depositing the requested coinage in the coinbox 92. This will cause closure of the normally open switch 93 by coin sizing apparatus (not shown) a number of times which is determined by the value of the coin which is deposited. By virtue of the series connection of switch 93 to solenoid 94 to B+, each time switch 93 closes it energizes solenoid 94. This pulls pawl 95 to the right and in contact with the rack 96. This, in turn, drives member 66 to the left, or toward the paid-up position, an amount determined by the number of times switch 93 closes. Thus, upon the payment of the price indicated on the scale 74, the slide member 66 is moved to the paid-up position, and when it reaches the paid-up position the member 76 engages the switch 80 and closes it. Slide member 66 is held in the paid-up position by the engagement of the pawl member 126 with the rack 96. The fact that contacts 128A and 80 are closed enables the converter apparatus, or decoder apparatus of the receiver, to operate. The subscriber then receives the subscription-television program.

At the conclusion of the subscription-television program, the pricing tone is discontinued, whereupon relay 128 is no longer energized. The holding pawl 126 is returned to its disengaged position by the spring 130. The spring 70 can then pull back the slide member 66 and therewith the slide member 48 to the unpaid or maximum price position and the system is thus in position for a new price demand.

There has accordingly been shown and described herein a novel, useful, and inexpensive arrangement for transmitting information to a subscriber's receiver and a subscription-television system, consisting of a single tone which causes apparatus at the receiver to respond thereto, to indicate the price represented by that tone and to enable a program to be viewed upon payment of the price indicated, and, finally, to reset the apparatus upon termination of the transmission of the tone. The use of the adjective "tone" in conjunction with pricing signals should not be construed as limiting the frequency of the single-frequency pricing signal to the sonic or ultrasonic region. Any set of frequencies for the pricing signals may be employed without departing from the spirit and scope of this invention, although the ultrasonic frequency region is preferred.

I claim:

1. In a subscription-television system of the type wherein signals representative of a price demanded for viewing a program are transmitted to a subscriber's receiver for payment before viewing of the program is permitted, the improvement comprising means at a transmitter for transmitting a single signal representative of a price, a receiver having means for receiving said single signal, a variable price indicator, means for varying said variable price indicator over its range of prices, and means responsive to said received single signal to stop said means for varying at a position whereat said variable price indicator will indicate the price represented by said single signal.

2. In a subscription-television system of the type wherein signals representative of a price demanded for viewing a program are transmitted to a subscriber's receiver for payment before viewing of the program is permitted, the improvement comprising means at a transmitter for transmitting a tone signal representative of a price, a receiver having means for receiving said tone signal, a variable tuning tone detector, a variable price indicator, means for simultaneously varying both the tuning of said variable tone detector and said variable price indicator, means for applying said received tone signal to said variable tuning tone detector, and means actuated responsive to detection of said tone signal by said variable-tuning tone detector for stopping operation of said means for simultaneously varying at a position whereat said variable price indicator indicates the price represented by said tone signal.

3. In a subscription-television system of the type wherein a price must be paid for viewing a program, said price being transmitted as a tone signal to a subscriber's receiver, apparatus at a subscriber's receiver comprising means for receiving said tone signal, a variable price indicator, means for varying said variable price indicator over its range of prices, and means responsive to said received signal to stop said means for varying at a position whereat said variable price indicator will indicate the price represented by said single signal.

4. In a subscription-television system of the type wherein a price must be paid for viewing a program, said price being transmitted as a tone signal to a subscriber's receiver, apparatus at a subscriber's receiver comprising means for receiving said tone signal, a variable price indicator, a variable-tuning tone detector, means for simultaneously varying both the tuning of said variable tone detector and said variable price indicator, means for applying said received tone signal to said variable-tuning tone detector, and means actuated responsive to detection of said tone signal by said variable tuning tone detector for stopping operation of said means for simultaneously varying at a position whereat said variable price indicator indicates the price represented by said tone signal.

5. In a subscription-television receiver as recited in claim 4 wherein said means for simultaneously varying both the tuning of said variable-tuning tone detector and said variable price indicator includes a motor, means for coupling said motor to said variable-tuning tone detector and to said variable price indicator for driving them from an initial position at one extreme of their respective ranges to a position at another extreme of their respective ranges, and means for restoring said variable-tuning tone detector and said variable price indicator to said an initial position from said other extreme of their respective ranges.

6. In a subscription-television system of the type wherein payment of a price is demanded for viewing a program, said price being transmitted as a tone signal to a subscriber's receiver, apparatus at a subscriber's receiver comprising means for receiving said tone signal, a tone-signal detector tunable over a range of tone signals, a variable price indicator indicating prices ranging from maximum to paid up, means for simultaneously continuously varying said tone-signal detector and said variable price indicators over their respective ranges, means for applying said received tone signal to said tone-signal detector, means responsive to output from said tone-signal detector when it is tuned, said means for continuously varying whereat said variable price indicator indicates a price represented by said tone signals, coinbox means responsive to the deposit of coins therein for advancing said variable price indicator from the position at which it is stopped to its paid position, means for holding said variable price indicator at its paid position, and means responsive to the cessation of the transmission of said tone signals for disenabling said means for holding and for enabling said means for varying.

References Cited by the Examiner

UNITED STATES PATENTS

| | | | |
|---|---|---|---|
| 2,731,620 | 1/56 | Gottfried | 178—6 |
| 3,021,383 | 2/62 | Mountjoy | 178—6.1 |
| 3,071,642 | 1/63 | Mountjoy | 178—5.1 |

DAVID G. REDINBAUGH, *Primary Examiner.*

ROY LAKE, *Examiner.*